Figures 1, 2:
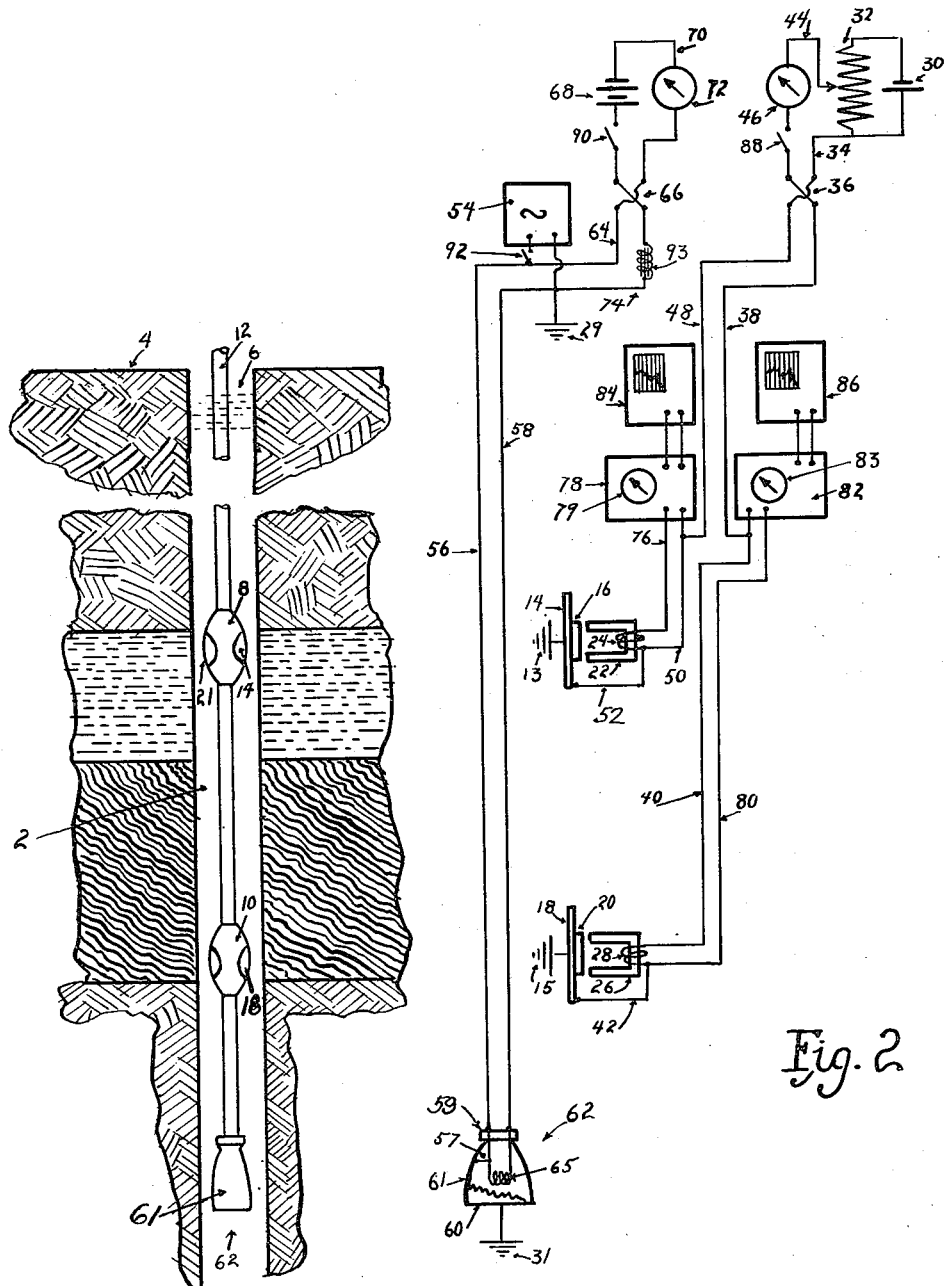

Feb. 20, 1940. L. B. SLICHTER 2,190,686
MINERAL EXPLORATION
Original Filed Jan. 29, 1936 2 Sheets-Sheet 1

INVENTOR.
Louis B. Slichter
BY
David Rivea
ATTORNEY.

Feb. 20, 1940.  L. B. SLICHTER  2,190,686
MINERAL EXPLORATION
Original Filed Jan. 29, 1936  2 Sheets-Sheet 2

INVENTOR.
Louis B. Slichter
BY
David Rives
ATTORNEY.

Patented Feb. 20, 1940

2,190,686

UNITED STATES PATENT OFFICE 2,190,686

MINERAL EXPLORATION

Louis Byrne Slichter, Belmont, Mass., assignor to Schlumberger Well Surveying Corporation, Houston, Tex., a corporation of Delaware Application January 29, 1936, Serial No. 61,324
Renewed May 17, 1939

33 Claims. (Cl. 175—182)

The present invention relates to mineral exploration in the earth, using the term "mineral" in a generic sense, to include ore bodies, rocks, oil, water, and the like. The invention relates also to acoustic or seismic and to electrical measurements. From a more specific aspect, the invention relates to the measurement, or detection, in connection with exploration of the above-described character, and particularly at different depths of a drill hole in mineral lands and oil fields, of a combination of acoustic or seismic and electromagnetic phenomena; as an illustration, the acoustic or seismic measurement of the porosity of the geologic formations surrounding a drill hole and the measurement of the electrical resistivity or some other electromagnetic property of the same. Such a combination of measurements will enable one to determine the presence of sandstones, limestones and loose sands, as well as other rock strata, and also their thickness, depth and certain additional characteristics of the strata which have geological significance. Such data are particularly desirable when one is prospecting for gas and oil, or when one is seeking to locate underground water.

It is accordingly an object of the present invention to provide a new and improved method of simultaneously measuring or detecting both the acoustic or seismic absorption and the electrical specific resistivity or other electromagnetic property or properties dependent upon the constants of the ground; and preferably using the same, novel, common apparatus.

Another object is to provide a new and improved acoustic or seismic method of and apparatus for indicating differences in porosity of the geologic formations surrounding drill holes that shall be adapted, at the same time, for indicating resistivity or the said other electromagnetic property or properties.

A further object is to provide a new and improved method of and apparatus for effecting such measurement or detection; involving, preferably, the introducing of electric current into the ground from a source in common with an acoustic or seismic source or sources and measuring or detecting the resulting difference in potential between the same apparatus that includes several seismic receivers. Economy and simplification of apparatus is thus effected; for the same electric circuits that introduce the alternating current to the acoustic source or sources and receivers are utilized as conductors for the direct-current and direct-potential leads of the electric apparatus.

To avoid circumlocution of language, the term "measure" or its equivalent will be employed in the claims appended to this specification to include "detect" or its equivalent, or the detection of or measurement of changes from a normal value of the quantities being observed.

Other and further objects, to the ends of obtaining as complete data as possible relating to the character and the structure of the rock or other strata in the neighborhood of the drill hole, will be explained hereinafter.

Figure 3:
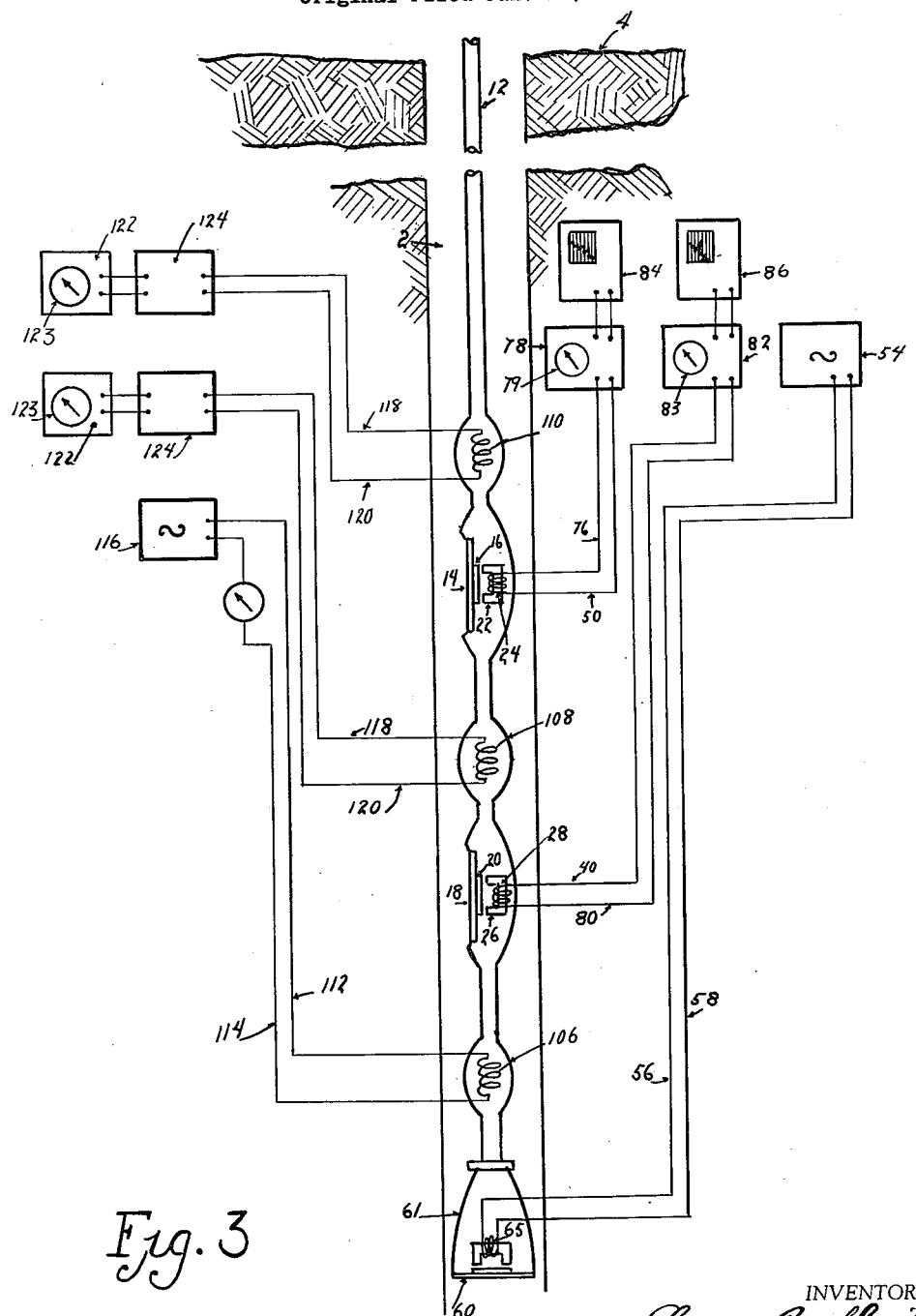

The invention will now be explained in connection with the accompanying drawings, in which Figs. 1 and 2 are diagrammatic views illustrating the measurement or detection of porosity and resistivity, Fig. 1 being a vertical section through a vertically disposed drill hole, and Fig. 2 being a diagrammatic view of circuit connections; and Fig. 3 is a view largely similar to Fig. 2, illustrating the simultaneous detection of variations in the acoustic absorption or porosity and in the electromagnetic properties of the ground.

The invention is illustrated as applied to the exploration of the earth in the neighborhood of a drill hole 2 extending from the surface 4 down into the earth. The drill hole is shown extending vertically downward, but it may be inclined, and certain features of the invention are not restricted to drill-hole exploration.

A pair of magnetophone receivers 8 and 10, vertically spaced at a constant distance from each other, are adapted to be lowered into the drill hole, by means of an insulated cable 12. Though the receivers 8 and 10 are illustrated as of the magnetophone type, it will be understood that the invention may embody acoustic or seismic receivers of other types.

In Fig. 3, the magnetophones are shown physically contained within casings, which are illustrated also in Fig. 1, but in Fig. 2, the magnetophones are shown detached from their casings, for clearness. The casings become grounded, as illustrated diagrammatically at 13 and 15, respectively, by contact with the water or mud 6 that is usually contained in the drill hole, or in any other desired manner. The units 8 and 10 may, therefore, be used as electrodes, and will henceforth be, at times, called electrodes and, at other times, magnetophones. The magnetophone of the electrode 8 comprises an acoustic diaphragm or diaphragms 14 and an armature 16 therefor, all contained in the casing of the electrode 8; and the magnetophone of the electrode 10 similarly comprises a similar diaphragm or diaphragms 18 and an armature 20 therefor, all contained in the casing of the electrode 10. The armature 16 cooperates with an electromagnet 22 the coil of which is shown at 24 and the armature 20 with an electromagnet 26 the coil of which is shown at 28. The casings of the electrodes 8 and 10 are each provided with a removable cover 21 for permitting access into the respective casings. A fuller description of one form of such electrodes 10 may be found in a copending application, entitled "Method and means of geological survey", Serial No. 9,046, filed March 2, 1935, reference to which is made for details not fully described herein.

The preferred submarine-signalling oscillator or sound generator will now be described. A generator 54 of oscillations is shown in Fig. 2 connected, by means of insulated wire conductors 56 and 58, to a high-impedance coil 65 in a casing 61, that is disposed in contact with the water, or otherwise grounded, as indicated at 31. The casing 61 carries an acoustic diaphragm 60. The conductors 56 and 58 may be suitably transposed, twisted and/or shielded and, together with other wires, may form part of the cable 12.

The coil 65 may, in some cases, and with other connections, be replaced by a low-impedance coil, as will be understood by persons skilled in the art. A suitable alternating-current ammeter or other instrument (not shown) may be connected in circuit with the electric oscillator 54 for measuring the alternating current of the circuit. The coil 65 may continuously vibrate the diaphragm 60 to constitute a sound transmitter 62 for producing periodic or interrupted sound impulses. Any other source of acoustic or other seismic energy may, of course, be employed, such as explosives. If supersonic or sub-audible frequencies are desired, piezo-electric or magnetostrictive sources of compressional waves of shorter or longer wave length than that of the ordinary seismic vibrations are particularly advantageous. If desired, furthermore, more than one sound source may be employed, and the number of magnetophone or other receivers 8 and 10 may be made more or less than two, as described in the said application. It is only necessary that the diaphragms 14 and 18 or their substitutes be responsive to the acoustic impulses of the sound transmitter or transmitters, so as to enable them to act as receivers of the acoustic energy emitted by the sound transmitter or transmitters. The sound source 62 will usually be positioned in the drill hole, preferably below the other apparatus described; it is shown carried at the bottom of the cable 12, at a fixed distance below the electrodes 8 and 10. The sound transmitter serves to weight the cable 12, though additional weight may be provided, if desired.

Acoustic-impulse signals are thus periodically generated by the sound transmitter in the direct-current field in which the magnetophones 8 and 10 are disposed, and are propagated through the water 6, or the air of a dry drill hole, and also through the rock or other strata, as described in the said application, to the diaphragms 14 and 18. The intensity of the sound impulses received by the diaphragm 14 will, of course, be different from that received by the diaphragm 18.

The electromagnetic coil 24 is connected by conductors 50 and 76 to an alternating-current, acoustic, amplifier-detector 78, provided with any suitable indicating instrument 79, and/or, if desired, to a graphic recorder 84 for producing a permanent record of the intensity of the acoustic-signal impulse received by the diaphragm 14. The electromagnetic coil 28 is similarly connected by conductors 48 and 88 to an alternating-current acoustic, amplifier-detector 82, provided with similar indicator 83, and/or, if desired, to a similar graphic recorder 86. The detectors 78 and 8 may be connected to the circuit of the magnetophones 8 and 10 otherwise than as shown, fo example, by transformer-coupling them to th circuit of the electrodes 8 and 18. It is possibl not only thus to measure or detect the acousti impulses, with the aid of the same electrodes and 10 that are used for the resistivity measurements, as will hereinafter appear, but also t measure their intensity. It is sufficient, of course to measure the relative intensities of the acoustic signal impulses received by the diaphragms 14 and 18.

The drill hole 2 is naturally bounded by rock or other strata that will absorb the sounds emitted by the acoustic generator differently, depending upon the nature of the rock, or other strata. The intensity of the sounds received by the diaphragms 14 and 18, therefore, will vary with the kind of rock or other stratum, as well as with the different positions occupied by the diaphragms 14 and 18 as the cable 12 is lowered into the drill hole. The difference in the sounds absorbed will depend also upon the frequency of the oscillations of the generator 54, which frequency may be selective, in order to reduce the influence of other noises, such as those produced by lowering the cable into the drill hole, and to adapt the apparatus to the particular strata being explored. The sound-receiving diaphragms 14 and 18 may therefore be, not only sensitive, but also selective; such as may be had, for example, with magnetostrictive receivers.

In order to measure resistivity, the electrodes 8 and 10 may be utilized as the two potential electrodes illustrated and described in Letters Patent of the United States, 1,826,961, granted October 13, 1931. Two further electrodes, described in the said Letters Patent as current electrodes, may be constituted by the grounds 29 and 31, hereinafter more fully described. The grounded electrode 29, for example, shown connected to the conductor 58, may be disposed either in the drill hole 2 or on the surface 4 of the earth; and the grounded electrode 31 may be disposed below the electrodes 8 and 10, so as to become grounded by contact with the water or the mud in the drill hole. It is not essential, however, to employ the exact resistivity apparatus illustrated and described in the said Letters Patent; for example, it is not essential that the electrodes be equally spaced, and the measurements may be carried out with two electrodes, only one of which need be in the hole, as hereinafter described, instead of all four described in the said Letters Patent. It will be convenient, however, to describe the invention in connection with the use of all four illustrated electrodes 8, 10, 29 and 31.

It will presently be explained that the grounded electrodes 29 and 31 are connected together in a circuit including a source of direct-current, electromotive force, such as a battery 68, so that direct current flows through the earth between these grounded electrodes 29 and 31, producing a potential difference in the earth between the electrodes 8 and 10. A measurement of the value of this potential difference will, of course, yield the resistivity of the strata surrounding the drill hole between the positions occupied by the electrodes 8 and 10, as explained in the said Letters Patent. Such measurement may be effected by connecting the electrodes 8 and 10 into a suitable circuit. To this end, a battery 30 is shown in circuit with a variable resistor 32 to constitute a potentiometer, which may be disposed on the surface 4 of the ground. From one end of the potentiometer, the potential-measuring circuit extends by way of a conductor 34, through a commutating reversing switch 36, such as is described in the said Letters Patent, by way of conductors 38 and 40, through the coil 28, and by way of a conductor 42, to the electrode 10. From the other end, which may be the adjustable end, of the potentiometer, the circuit extends to the reversing switch 36 by way of a conductor 44, in which is connected a direct-current, ammeter galvanometer 46; and from the reversing switch 36, by way of conductors 48, 50 and 52, to the electrode 8. The potential difference between the electrodes 8 and 10, resulting from the direct-current field produced in the ground by the circuit through the grounded electrodes 29 and 31, may thus be measured by the ammeter 46.

Current is supplied to the current electrode 29 from one end of the battery 68, through a reversing, commutating switch 66 corresponding to the commutator 9 of the said Letters Patent, and by way of a conductor 74, which is grounded at 29. From the other end of the battery 68, the circuit continues by way of a conductor 70, through a direct-current ammeter 72 and the reversing switch 66, and by way of conductors 64 and 56 and a conductor 57 that extends through an insulating plate 59, to the casing 61. The battery 68, as before stated, thus serves as a source of direct current for the circuit between the current electrodes 29 and 31, thereby producing a direct-current field within which are positioned the potential electrodes 8 and 10.

The use of the commutating reversing switch 36 renders it possible to reverse the connections of the electrodes 8 and 10 to the galvanometer 46; as described in the said Letters Patent, readings will be made, in the potentiometer 32, of the voltage between these electrodes in both positions of the reversing switch 36. Similar considerations apply to the reversing switch 66, which is reversed synchronously with the switch 36.

The purpose of the synchronous reversing of the current and potential leads above described is to enable the component of the potential differences caused by the known current to be measured separately from any other component of potential difference between the electrodes 8 and 10 arising from other causes. This purpose may obviously be accomplished by similar methods, which are in effect equivalent to that described. For example, instead of reversing the current, its value may be changed by a known amount, and the corresponding change in the observed potentials between the electrodes 8 and 10 noted. The knowledge of the change in current and of the associated change in the potentials, enables the resistivity of the surrounding rock to be estimated.

Furthermore, a low-frequency, alternating-current source is essentially equivalent to a commutated current source for the purposes of the present invention.

It is thus possible to obtain a combination of both seismic or acoustic and resistivity measurements at various points of the drill hole as the electrodes are successively carried past those points. It is of great value, furthermore, to be able to perform these two measurements with the same apparatus, the sound generator serving also as a current electrode and the potential electrodes serving also as the sound receivers; some of the difficulties involved in manipulating long, heavy cables into drill holes become thus minimized. It is of considerable advantage to have only two or three conductors, instead of six or eight, in the cable, at depths in the neighborhood of 5,000 feet.

Provision may also be made for disconnecting the conductors 38 and 48 from the potentiometer 32, as by means of a switch 88. A low-resistance, high impedance, choke coil 93 may be used to reduce the alternating current from the oscillator 54 in the parallel circuit through the meter 72.

Also, a switch 90 may be employed for disconnecting the conductors 64 and 74 from the battery 68, and another switch 92 between the oscillation generator 54 and the conductor 56 may disconnect the oscillation generator 54 from the acoustic generator. If the switches 88, 90 and 92 are maintained permanently closed, the readings of resistivity and porosity may be made simultaneously. By successive manual or automatic opening and closing of these switches in suitable sequence, however, it is possible to make these readings of acoustic absorption and resistivity successively. This procedure avoids interference or cross talk between the several circuits involved, and is desirable when the measurements are made at great depth. Measurements may be made at distinct, separate points of the drill hole, or continuously, as the cable is lowered. It is possible to measure also spontaneous or natural potentials between the casings of the electrodes 8 and 10 by the same method, without creating an artificial field. The said casings, of course, may be adapted as special electrodes for measuring spontaneous potentials.

As hereinbefore stated, resistivity measurements may also be made in the vicinity of the electrode 31 with only two electrodes, by reading the current in the meter 72 and correcting for the other resistances in the circuits 56, 64, 66, 72, 70, 68, 90, 93, 74, 29, 58, 65.

According to the embodiment of the invention illustrated in Fig. 3, provision is made for combining the porosity measurements with electrical measurements of inductive type. In addition to the diaphragms 14 and 18 for measuring the sound impulses, therefore, the cable 12 is provided with an electromagnetic source and receiving coils, preferably at fixed positions along the cable 12, as described in a copending application by Charles B. Aiken, Serial No. 70,595, filed March 24, 1936. One source coil is illustrated at 106 and several receiving coils at 108 and 110, though any number of source and receiving coils may be employed.

The source coil 106 is shown connected by insulating, conducting wires 112 and 114 to a generator 116 of alternating current, located at a fixed point on the surface 4 of the earth, near the drill hole 2. The generator 116 may be an electric oscillator of any approved type and any convenient frequency, say, 10 cycles or less to 100,000 cycles or more. The circuit of the elements 106, 112, 114 and 116 may be referred to as the source circuit, and the circuits of the coils 108 and 110 as the receiving circuits. The receiving circuits of the coils 108 and 110 are shown in Fig. 3, for example, as each comprising insulated conducting wires 118 and 120 and a galvanometer, telephone, or other detecting instrument 122, with or without an amplifier 124. The instrument 122 may have a visual indicator 123.

An alterating, electromagnetic field is thus created, surrounding the source coil 106, and electromotive voltages are thus induced into the receiving coil 108 or the receiving coils 108 and 110, so that currents are caused to flow in the receiving circuits of these coils 108 and 110. It is not necessary that the space between the coils be conducting, as it is the alternating, magnetic field generated by the source coil or coils, and not an electric current, that is picked up by the receiver coil or coils. It will further be noted that the coils are not grounded.

The energy received by the coils 108 and 110 is affected by the electromagnetic properties of the neighboring rock or other strata. This energy is amplified by the amplifier 124 and indicated on the meter 122. In the case of a plurality of coils 106, at different points of the drill hole, the voltage induced in each may be separately recorded.

After one such reading has been obtained, the source and receiver coils will be lowered a further step in the drill hole. The lowering is effected by relatively short steps a little at a time, or continuously, and observations are made with the galvanometer or other instrument 122, either at the end of each step of lowering movement or continuously. The observations may comprise measurements of voltage, current, amplitude, phase or other characteristics of the electromagnetic field of the source coil, as picked up by the receiver coils in the neighborhood of the strata in which they are disposed. Such measurements will afford data from which to estimate the mineral characteristics of the explored strata. Owing to the different resistivity or other electric properties of the wall-rock strata surrounding the source and receiver coils after any further lowering step, the balance obtained prior to such further lowering step will become upset. If, for example, the galvanometer 122 previously read zero, the reading will now, in general, be some other value, not zero. The difference in the readings may be used directly as a measure of the change in the wall rock; or, if preferred, a new neutralization or other adjustment may be made to restore the reading to its former value, and such new adjustment will furnish data from which an estimate may be made of the difference in the nature of the strata surrounding the source and the receiver coils in their various positions of lowering into the drill hole.

As described in the said Aiken application, it is possible to neutralize the signal, and also to compensate separately for phase and amplitude, and readily to compare them with a reference value, thus affording further data for determining the nature of the strata surrounding the drill hole at various depths.

Useful data may also be obtained by varying the distance between source and receiver coils, keeping one or the other in a fixed position. This might be accomplished by moving one of them or by providing several receiver coils and means for switching first one and then another of them into circuit.

In the claims which follow the word "electromagnetic" will be used in a broad sense. Thus an electromagnetic field will denote an electric field, a current field, a magnetic field, or any of the above fields in combination. Among the electromagnetic properties of material are the electrical resistivity, the dielectric constant, and the magnetic permeability.

Further modifications will occur to person skilled in the art, and all such are considered to fall within the spirit and scope of the invention, as defined in the appended claims.

What is claimed is:

1. Apparatus for exploring a drill hole in the earth having, in combination, means for producing periodic, acoustic impulses, means for receiving the impulses at predetermined points of the drill hole, means for indicating the intensity of the impulses, means comprising the acoustic-impulse producing means for creating a magnetic field in the drill hole, and means for measuring the electromagnetic field for determining an electromagnetic property of the strata surrounding the drill hole at the predetermined points.

2. Apparatus of the character described having, in combination, common means for creating an electromagnetic field and a periodic, acoustic field, a plurality of spaced receivers disposed in the field and responsive to acoustic energy, means for measuring the electrical properties of the ground neighboring the receivers, and means for measuring the acoustic field between the receivers.

3. Apparatus of the character described having, in combination, means for creating an electromagnetic field, means for producing a periodic, acoustic field, a plurality of spaced receivers disposed in the field and responsive to acoustic energy, means for measuring the voltage between the receivers resulting from the electromagnetic field, and means for measuring the acoustic field between the receivers, the last-named means having a common electric circuit.

4. Apparatus of the character described having, in combination, four electrodes, one of the electrodes having means for producing acoustic impulses, two others of the electrodes having means responsive to the acoustic impulses, means for connecting the said one electrode with the fourth electrode into an electric system to cause an electric current to flow through the earth between the said one electrode and the said fourth electrode, the said two other electrodes being disposed in the potential field created by the said current, means for measuring the voltage between the said two other electrodes resulting from the electric-current field, and means for measuring the acoustic impulses received by the said acoustic-responsive means of the said two other electrodes.

5. Apparatus for exploring the geologic structure in the vicinity of a drill hole comprising a cable adapted to be lowered into the drill hole, a generator of alternating current, a source coil or coils carried by the cable in the drill hole, means for supplying the coil or coils with currents from said generator, a receiver coil or coils carried by the cable disposed at predetermined points along the drill hole in such manner that the field of said source coil or coils will induce electromotive forces in said receiver coil or coils, means for observing said induced electromotive forces, means carried by the cable for producing a periodic, acoustic field, means carried by the cable in the drill hole responsive to the acoustic field at the said predetermined points of the drill hole, and means for measuring the intensity of the acoustic field.

6. Apparatus for exploring a drill hole in the earth having, in combination, a cable adapted to be lowered into the drill hole, three spaced electrodes carried by the cable in the drill hole, one of the electrodes being grounded, an acoustic generator carried by the cable, a surface electrode, means for creating an electric field between one of the three electrodes in the hole and the surface electrode, one or both of the other electrodes in the hole being provided with means for receiving the acoustic energy generated by the acoustic generator, means for measuring a difference in the electrical field between any electrode pairs, and means for measuring the acoustic energy received by the acoustic-energy-receiving means.

7. Apparatus of the character described having, in combination, means for creating an electric field in the strata surrounding a drill hole below the surface of the ground, a cable adapted to be lowered into the drill hole, an acoustic generator carried by the cable, a plurality of spaced electrodes carried by the cable in the drill hole, a plurality of the electrodes having means responsive to the acoustic impulses of the acoustic generator, means for measuring the voltage between the electrodes resulting from the field, and means for measuring the acoustic impulses received by the acoustic-responsive means of the electrodes.

8. Apparatus for exploring a drill hole in the earth having, in combination, a cable adapted to be lowered into the drill hole, three spaced electrodes carried by the cable in the drill hole, one of the electrodes being grounded, an acoustic generator carried by the cable, a surface electrode, means for creating an electric field between one of the electrodes in the hole and the surface electrode, one or both of the other electrodes in the hole being provided with means for receiving the acoustic energy generated by the acoustic generator, and means for measuring the relative intensity of the acoustic energy received by the acoustic-energy-receiving means.

9. Apparatus of the character described having, in combination, two electrodes, one of the electrodes having means for producing acoustic impulses, sound-receiving means responsive to the acoustic impulses, means for connecting the electrodes into an electric system to cause an electric current to flow through the earth between the electrodes, means for measuring the current flowing between the electrodes, and means for measuring the acoustic impulses received by the sound-receiving means.

10. Apparatus for exploring a drill hole in the earth having, in combination, a cable adapted to be lowered into the drill hole, a plurality of electrodes carried by the cable in the drill hole, means for producing acoustic impulses and sound-receiving means responsive to the acoustic impulses carried by the cable and spaced in the drill hole at predetermined points with reference to the electrodes, means for connecting a plurality of the electrodes into an electric system to cause an electric current to flow through the earth between the electrodes, means for measuring the current flowing between a plurality of the electrodes, and means for measuring the acoustic impulses received by the sound-receiving means, the two last-named means comprising common conductors forming part of the cable.

11. Apparatus for exploring a drill hole in the earth having, in combination, a cable adapted to be lowered into the drill hole, an acoustic generator carried by the cable in the drill hole, a plurality of electrodes carried by the cable in the drill hole and provided with means for receiving the acoustic energy generated by the acoustic generator, means for measuring the relative intensity of the acoustic energy received by the acoustic-energy-receiving means, and means for measuring a difference of potential between a plurality of the electrodes.

12. Apparatus of the character described having, in combination, a cable adapted to be lowered into a drill hole, an acoustic generator carried by the cable in the drill hole, a plurality of spaced electrodes carried by the cable in the drill hole, a plurality of means spaced at predetermined distances from, and responsive to the acoustic impulses of, the acoustic generator, means for measuring the acoustic impulses received by the acoustic-impulse-responsive means, and means for measuring a difference of potential between a plurality of the electrodes.

13. Apparatus for exploring a drill hole in the earth having, in combination, a cable adapted to be lowered into the drill hole, a plurality of electrodes carried by the cable in the drill hole, means for producing acoustic impulses and sound-receiving means responsive to the acoustic impulses carried by the cable and spaced in the drill hole at predetermined points with reference to the electrodes, means for connecting a plurality of the electrodes into an electric system to cause an electric current to flow through the earth between the electrodes, means for measuring the current flowing between a plurality of the electrodes, means for measuring the potential difference between a plurality of the electrodes, and means for measuring the acoustic impulses received by the sound-receiving means, the two-last-named means comprising common conductors forming part of the cable.

14. A method of exploring a drill hole in the earth that comprises creating acoustic and electromagnetic fields in the drill hole and, at successively different positions in the drill hole, measuring both fields to determine successively, at the successively different positions, both acoustic and electromagnetic properties of the geologic formations surrounding the drill hole at the successively different positions.

15. A method of exploring a drill hole in the earth that comprises creating acoustic and electromagnetic fields in the drill hole and, at successively different positions in the drill hole, simultaneously measuring both fields to determine successively, at the successively different positions, both acoustic and electromagnetic properties of the geologic formations surrounding the drill hole at the successively different positions.

16. A method of exploring a drill hole in the earth that comprises creating acoustic and electromagnetic fields in the drill hole and, at successively different positions in the drill hole, successively measuring both fields to determine successively, at the successively different positions, both acoustic and electromagnetic properties of the geologic formations surrounding the drill hole at the successively different positions.

17. A method of exploring a drill hole in the earth that comprises measuring, at successively different positions in the drill hole, both acoustic and electromagnetic phenomena to determine successively, at the successively different positions, both acoustic and electromagnetic properties of the geologic formations surrounding the drill hole at the successively different positions.

18. A method of exploring a drill hole in the earth that comprises creating an acoustic field in the drill hole and, at successively different positions in the drill hole, measuring both the acoustic field and the electrical resistivity of the strata surrounding the drill hole at the successively different positions.

19. A method of exploring a drill hole in the earth that comprises creating an electromagnetic field in the earth strata surrounding the drill hole, producing periodic, acoustic impulses in the drill hole and, at successively different positions in the drill hole, measuring the electromagnetic field and receiving the acoustic impulses at pairs of points of the drill hole and measuring the relative intensity of the received acoustic impulses at the pairs of points to determine successively, at the successively different positions, both acoustic and electromagnetic properties of the geologic formations surrounding the drill hole at the successively different positions.

20. A method of exploring a drill hole in the earth that comprises creating an acoustic field in the drill hole and, at successively different positions in the drill hole, measuring both the acoustic field and an electromagnetic phenomenon to determine successively, at the successively different positions, both acoustic and electromagnetic properties of the geologic formations surrounding the drill hole at the successively different positions.

21. A method of exploring a drill hole in the earth that comprises creating an acoustic field in the drill hole and, at successively different positions in the drill hole, measuring both the acoustic field and the spontaneous difference of potential between a plurality of points in the drill hole to determine successively, at the successively different positions, both acoustic and electromagnetic properties of the geologic formations surrounding the drill hole at the successively different positions.

22. A method of exploring a drill hole in the earth that comprises radiating an electromagnetic field and sending acoustic impulses from the same point in the drill hole, moving the point to various positions in the drill hole and, at successively different positions at a substantially constant distance from the various positions, measuring the field and receiving the acoustic impulses to determine successively, at the successively different positions, both acoustic and electromagnetic properties of the geologic formations surrounding the drill hole at the successively different positions.

23. A method of exploring a drill hole in the earth that comprises creating an electromagnetic field in various positions in the drill hole, creating an acoustic field in the drill hole and, at successively different positions in the drill hole at a substantially constant distance from the various positions, measuring both fields to determine successively, at the successively different positions, both acoustic and electromagnetic properties of the geologic formations surrounding the drill hole at the successively different positions.

24. A method of exploring a drill hole in the earth that comprises creating an acoustic field in various positions in the drill hole, creating an electromagnetic field in the drill hole and, at successively different positions in the drill hole at a substantially constant distance from the various positions, measuring both fields to determine successively, at the successively different positions, both acoustic and electromagnetic properties of the geologic formations surrounding the drill hole at the successively different positions.

25. A method of exploring a drill hole in the earth that comprises creating acoustic and electromagnetic fields simultaneously in various positions in the drill hole and, at successively different positions in the drill hole at a substantially constant distance from the various positions, measuring both fields to determine successively, at the successively different positions, both acoustic and electromagnetic properties of the geologic formations surrounding the drill hole at the successively different positions.

26. Apparatus of the character described having, in combination, means for creating an electromagnetic field, means for producing a periodic acoustic field, a plurality of spaced combined electrodes and receivers disposed in the fields, means for measuring the voltage between the electrodes resulting from the electromagnetic field, and means for measuring the acoustic field between the receivers.

27. Apparatus for exploring a drill hole in the earth having, in combination, a cable adapted to be lowered into the drill hole, means carried by the cable in the drill hole for creating acoustic impulses and an electromagnetic field in the drill hole, means carried by the cable in the drill hole for receiving the acoustic impulses, means carried by the cable in the drill hole responsive to the electromagnetic field, and means connected with the acoustic-impulse-receiving means and the means responsive to the electromagnetic field for measuring acoustic and electromagnetic properties of the earth strata surrounding the drill hole.

28. Apparatus for exploring a drill hole in the earth having, in combination, a cable adapted to be lowered into the drill hole, means carried by the cable in the drill hole for creating acoustic impulses in the drill hole, means carried by the cable in the drill hole for receiving the acoustic impulses, means carried by the cable in the drill hole responsive to an electromagnetic field in the earth strata surrounding the drill hole, and means connected with the acoustic-impulse-receiving means and the means responsive to the electromagnetic field for measuring acoustic and electromagnetic properties of the earth strata surrounding the drill hole.

29. Apparatus for exploring a drill hole in the earth having, in combination, a cable adapted to be lowered into the drill hole, means carried by the cable in the drill hole for creating acoustic impulses in the drill hole, means carried by the cable in the drill hole for receiving the acoustic impulses, means carried by the cable in the drill hole responsive to the electrical resistivity of the earth strata surrounding the drill hole, and means connected with the acoustic-impulse-receiving means and the means responsive to the electrical resistivity for measuring acoustic properties and the electrical resistivity of the earth strata surrounding the drill hole.

30. Apparatus for exploring a drill hole in the earth having, in combination, a cable adapted to be lowered into the drill hole, means carried by the cable in the drill hole for creating an acoustic field in the drill hole, means carried by the cable in the drill hole responsive to the acoustic field, a pair of electrodes carried by the cable in the drill hole, means for measuring the difference of potential between the electrodes in the drill hole, and means connected with the acoustic-field-responsive means for measuring acoustic properties of the earth strata surrounding the drill hole.

31. Apparatus for exploring a drill hole in the earth having, in combination, a cable adapted to be lowered into the drill hole, means carried by the cable in the drill hole for creating acoustic impulses in the drill hole, a plurality of means carried in the drill hole by the cable at predetermined points thereof for receiving the acoustic impulses, a plurality of electrodes carried by the cable in the drill hole, means connected with the acoustic-impulse-receiving means for measuring acoustic properties of the earth strata surrounding the drill hole, and means connected with the electrodes for measuring an electromagnetic property of the earth strata surrounding the drill hole.

32. Apparatus for exploring a drill hole in the earth having, in combination, a cable adapted to be lowered into the drill hole, means carried by the cable in the drill hole for creating an acoustic field in the drill hole, means carried by the cable in the drill hole adapted to be lowered to successively different positions in the drill hole and responsive to the acoustic field, means carried by the cable in the drill hole adapted to be lowered to successively different positions in the drill hole and responsive to an electromagnetic field, means for measuring the intensity of the acoustic field, and means connected with the means responsive to the acoustic field and the means responsive to the electromagnetic field for measuring acoustic and electromagnetic properties of the earth strata surrounding the drill hole.

33. Apparatus for exploring a drill hole in the earth having, in combination, a cable adapted to be lowered into the drill hole, means carried by the cable in the drill hole at a predetermined point of the cable for radiating an electromagnetic field and sending acoustic impulses in the drill hole, means carried by the cable in the drill hole at a predetermined point of the cable at substantially a constant distance from the first-named predetermined point for receiving the acoustic impulses and responsive to the field, and means connected with the acoustic-impulse-receiving means and the means responsive to the electromagnetic field for measuring acoustic and electromagnetic properties of the earth strata surrounding the drill hole.

LOUIS B. SLICHTER.